M(12) United States Patent
Liao et al.

(10) Patent No.: US 7,962,956 B1
(45) Date of Patent: Jun. 14, 2011

(54) EVALUATION OF INCREMENTAL BACKUP COPIES FOR PRESENCE OF MALICIOUS CODES IN COMPUTER SYSTEMS

(75) Inventors: En-Yi Liao, Santa Clara, CA (US); Chinghsien Liao, Cupertino, CA (US)

(73) Assignee: Trend Micro Incorporated, Tokyo (JP)

( * ) Notice: Subject to any disclaimer, the term of this patent is extended or adjusted under 35 U.S.C. 154(b) by 1189 days.

(21) Appl. No.: 11/594,546

(22) Filed: Nov. 8, 2006

(51) Int. Cl.
*G06F 12/14* (2006.01)

(52) U.S. Cl. ............... 726/22; 726/14; 726/13; 726/34; 726/27

(58) Field of Classification Search .............. 713/153, 713/163, 183, 193, 340, 164, 150; 714/38, 714/49, 48, 35, 37; 709/203, 217, 223, 237, 709/225, 229, 227; 726/22, 14, 13, 11, 34, 726/25, 26, 27; 380/42, 55, 58, 46; 382/225, 382/581
See application file for complete search history.

(56) References Cited

U.S. PATENT DOCUMENTS

| 5,375,240 | A | 12/1994 | Grundy |
| 6,282,610 | B1 | 8/2001 | Bergsten |
| 6,345,368 | B1 | 2/2002 | Bergsten |
| 2004/0158730 | A1* | 8/2004 | Sarkar ........................ 713/200 |
| 2005/0193272 | A1 | 9/2005 | Stager et al. |
| 2005/0216536 | A1 | 9/2005 | Stager et al. |
| 2006/0080737 | A1* | 4/2006 | Freeman et al. ............... 726/24 |
| 2006/0107006 | A1 | 5/2006 | Green et al. |
| 2006/0137010 | A1 | 6/2006 | Kramer et al. |
| 2006/0139697 | A1 | 6/2006 | Fuente et al. |
| 2006/0143413 | A1 | 6/2006 | Agombar et al. |
| 2006/0195493 | A1 | 8/2006 | Chang et al. |
| 2007/0100905 | A1* | 5/2007 | Masters et al. ............... 707/201 |
| 2008/0047013 | A1* | 2/2008 | Claudatos et al. ............. 726/24 |

OTHER PUBLICATIONS

How Volume Shadow Copy Service Works, Microsoft TechNet, Mar. 28, 2003, 7 sheets, [retrieved on Oct. 5, 2006]. Retrieved from the internet: http://technet2.microsoft.com/WindowsServer/en/Library/2b0d2457-b7d8-42c3-b6c9-59c145b7765f1033.mspx?mfr=true.
File Storage Hardware and Disk Organization, Hard Disk Drive Basics, NTFS.com, 1998-2006, 4 sheets, [retrieved on Sep. 29, 2006]. Retrieved from the internet: http://www.ntfs.com/hard-disk-basics.htm.
Hard Drive Partition, Partition Table, NTFS.com, 1998-2006, 4 sheets, [retrieved on Sep. 29, 2006]. Retrieved from the internet: http://www.nffs.com/partition-table.htm.

\* cited by examiner

*Primary Examiner* — Vivek Srivastava
*Assistant Examiner* — Nega Woldemariam
(74) *Attorney, Agent, or Firm* — Okamoto & Benedicto LLP

(57) ABSTRACT

In one embodiment, incremental backups containing information on modified addressable portions of a data storage device are evaluated for presence of malicious codes ("malwares"). Each modified addressable portion may be individually accessed and scanned for malicious codes. Each modified addressable portion may also be mapped to its associated file, allowing the associated file to be scanned for malicious codes. These allow an incremental backup to be evaluated even when it only contains portions, rather than the entirety, of several different files. A clean incremental backup may be selected for restoring the data storage device in the event of malicious code infection.

14 Claims, 9 Drawing Sheets

EVALUATION OF INCREMENTAL BACKUP COPIES FOR PRESENCE OF MALICIOUS CODES IN COMPUTER SYSTEMS

BACKGROUND OF THE INVENTION

1. Field of the Invention

The present invention relates generally to data processing, and more particularly but not exclusively to methods and apparatus for detecting malicious codes in backups.

2. Description of the Background Art

Computer viruses, worms, Trojans, rootkits, and spyware are examples of malicious codes that have plagued computer systems throughout the world. Although there are technical differences between various types of malicious codes, malicious codes are also commonly collectively referred to as "viruses" or "malwares." The threat posed by malwares is well known, prompting most computer users to have some form of antivirus. However, some malwares, such as root kits, are difficult to detect and remove even with current antivirus techniques. What is needed is an effective technique for removing malwares from infected computers.

SUMMARY

In one embodiment, incremental backups containing information on modified addressable portions of a data storage device are evaluated for presence of malicious codes ("malwares"). Each modified addressable portion may be individually accessed and scanned for malicious codes. Each modified addressable portion may also be mapped to its associated file, allowing the associated file to be scanned for malicious codes. These allow an incremental backup to be evaluated even when it only contains portions, rather than the entirety, of several different files. A clean incremental backup may be selected for restoring the data storage device in the event of malicious code infection.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of apparatus, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
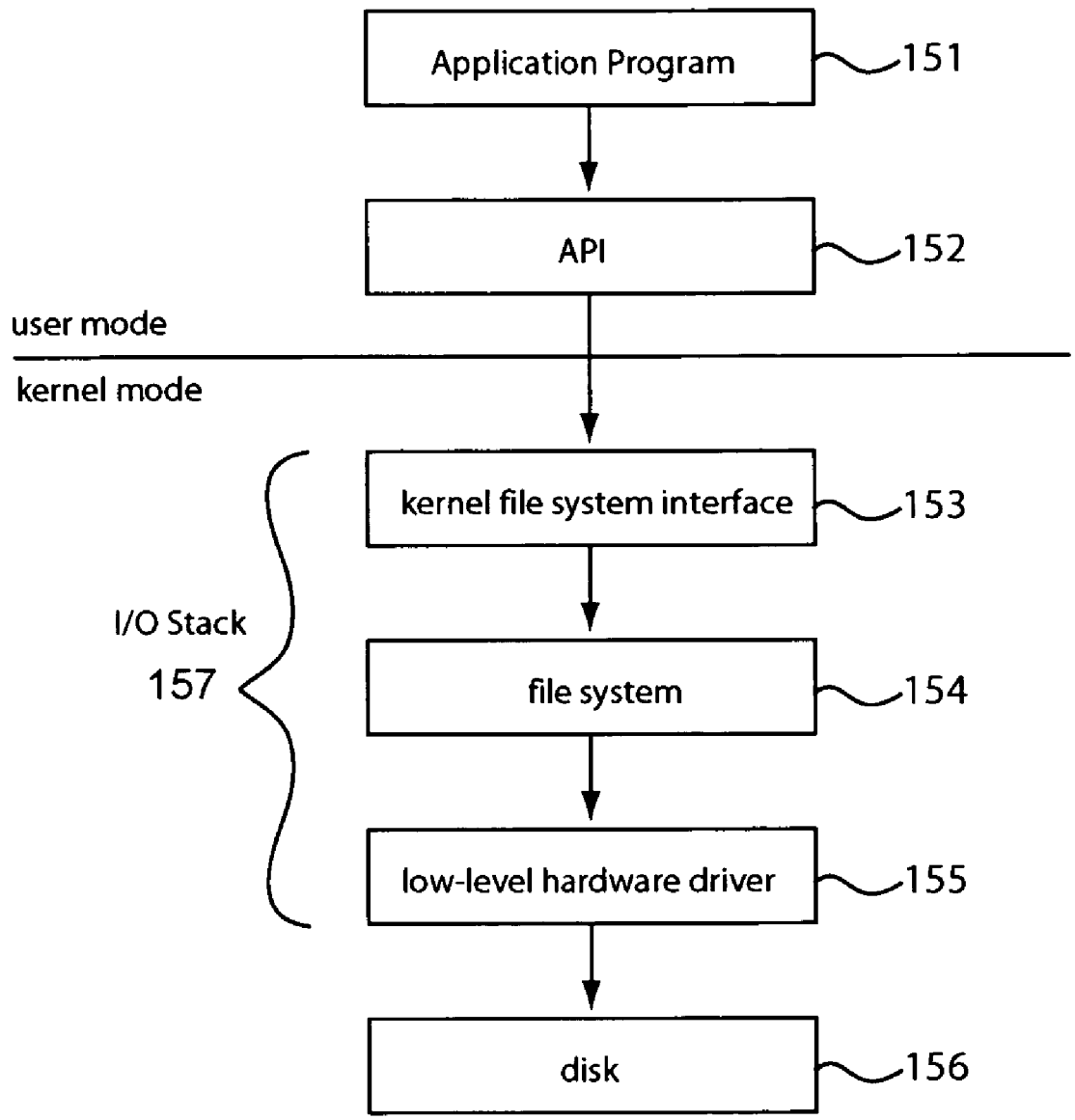
FIG. 1 shows a flow diagram illustrating how an application program may access data on a data storage medium.

FIG. 1 shows a flow diagram illustrating how an application program 151 may access data on a data storage medium, such as a hard disk 156. The flow diagram of FIG. 1 is applicable to a variety of operating systems but is explained here in the context of the Microsoft Windows™ operating system for illustration purposes.

In operation, the application program 151 running in user mode space may request access to a file stored in the disk 156 by calling into an application programming interface (API) 152 (e.g., Win32 API in conjunction with Kernel32.dll and NtDll.dll). The file access request is received and processed by a kernel file system interface 153 (e.g., NTOSKRNL.EXE in conjunction with DRIVER.SYS) running in kernel mode space. The kernel file system interface 153 asks a file system 154 (e.g., NTFS.SYS) for the file.

In general, modules above the file system 154 operate on a logical level, whereas modules below the file system 154 operate on a physical level. For example, the kernel file system interface 153 does not know where the data bits comprising the file are physically stored in the disk 156. All the kernel file system interface 153 knows is that there is a collection of data bits in the disk 156 that form the file. It is the job of the file system 154 to keep track of the physical portions of the disk 156 that correspond to particular files. In this case, the file system 154 employs a low-level hardware driver 155 (e.g., DISK.SYS, disk port driver, disk mini port driver) to directly access particular bits of data from the disk 156. The low-level hardware driver 155, like the rest of the I/O stack 157, operates in kernel mode space and is configured to directly access addressable portions of the disk 156. In general, the smallest addressable data unit on a physical (as opposed to logical) level on a disk is referred to as a "sector," and a collection of sectors is referred to as a "cluster." In the example of FIG. 1, the low-level hardware driver 155 accesses the sectors comprising the requested file in the disk 156.

A rootkit comprises computer-readable program code designed to conceal running processes, files, or system data. Rootkits may be used to surreptitiously modify parts of the operating system or install themselves as drivers or kernel modules. Increasingly, rootkits are being used by virus coders as malicious code or part of malicious code. For example, a rootkit may be used to hook into various modules shown in FIG. 1 or infect a computer system by direct kernel object manipulation (DKOM). Rootkits are thus especially difficult to detect and remove. Other malwares are also becoming more difficult to detect and remove by injecting themselves into legitimate and important processes, running multiple processes that monitor and revive each other, terminating or interfering with antivirus and other security products, taking advantage of operating system provided security features or system functions, automatically updating themselves with new patches and payloads, and so on.

Regardless of the sophistication of malwares, they have to be permanently stored on a data storage medium to survive a system reset or reboot. As will be more apparent below, embodiments of the present invention take advantage of this by looking for the presence of malwares in data storage devices and finding a clean incremental backup copy from which to restore the infected system.

Computer backups have been used as protective measures against data loss in the event of a hardware failure, software bug, human operator error, or natural catastrophe. A computer backup may be a full backup or an incremental backup. As its name implies, a full backup comprises a complete copy of the data such that the data can be restored solely using the full backup. A problem with full backups is that they take some time to create, especially when the data is relatively large. To avoid this problem, incremental backups may be created. An incremental backup saves a portion, rather than the entirety, of the data at a particular point in time usually after creation of a full backup. The full backup plus one or more incremental backups created thereafter may be used to restore the data in the event of an irrecoverable data storage device error, such as a hard disk crash. If the data storage device is still accessible, data on the device may be restored using one or more of the incremental backups without using the full backup. The details of restoring data from incremental and/or full backups depend on the particular backup technology employed.

Backup operations may also be performed online (i.e., while the computer is normally operating) or offline (i.e., with normal computer operations halted). In embodiments of the present invention, the preferred backup procedure involves creation of incremental backups while the computer system is online. This allows the backup procedure to proceed with minimal impact on system performance and normal operations. Example backup procedures that may be used in embodiments of the present invention include those employed by the Microsoft Volume Shadow Copy Service™ (VSS) backup service.

Figure 2:
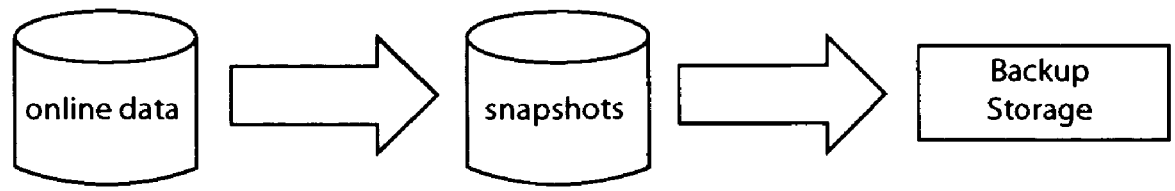
FIG. 2 schematically shows snapshots of online data being created and stored in a backup data storage device.

Backup copies may be created at different points in time to ensure that the most recent data is included in the backup. An incremental backup copy created at a particular point in time is also referred to herein as a "snapshot." FIG. 2 schematically shows snapshots of online data being created and stored in a backup data storage device. A backup data storage device may comprise magnetic tape, optical disk (e.g., DVD, CD-RW), external hard drive, and other data storage medium.

Figure 3:
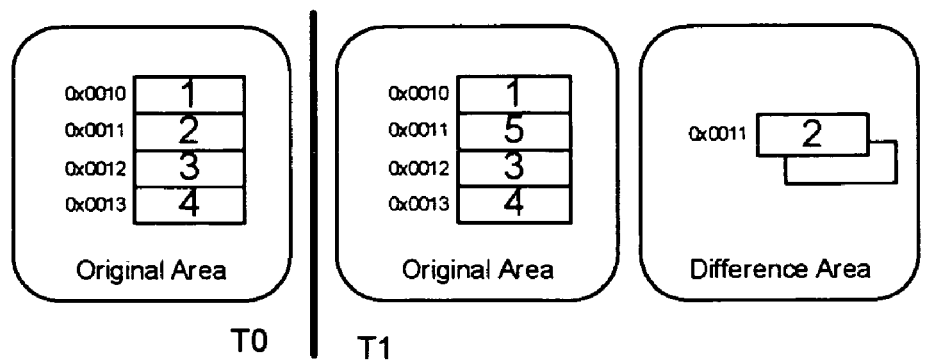
FIG. 3 schematically illustrates the operation of an example copy-on-write backup procedure.

Copy-on-write (COW), also referred to as "differential copy," is an incremental backup procedure that saves changes to data stored in a data storage device. In COW, a copy of original data in a storage device is saved in a difference area prior to being overwritten. COW may operate on the physical level. For example, COW may be used to store changes to data stored on sectors or clusters of a disk storage device. FIG. 3 schematically illustrates the operation of an example COW backup procedure. In the example of FIG. 3, the original area of the disk storage device has the data "1", "2", "3", and "4" at sectors 0x0010, 0x0011, 0x0012, and 0x0013, respectively, at time T0. At time T1, the "2" in sector 0x0011 is overwritten with the value "5." This results in the COW backup procedure writing in the difference area the original data in sector 0x0011 at time T0 ("2" in this example). Examples of backup services that may incorporate COW include the Microsoft Volume Shadow Copy Service™. For example, the Microsoft Volume Shadow Copy Service™ may be employed with a so-called "software provider," such as VOLSNAP.SYS in the Microsoft Windows™ operating system, to implement a COW backup procedure. Preferably, embodiments of the present invention operate on snapshots containing differential data created by a COW backup procedure to detect and remove malwares from infected computer systems.

Figure 4:
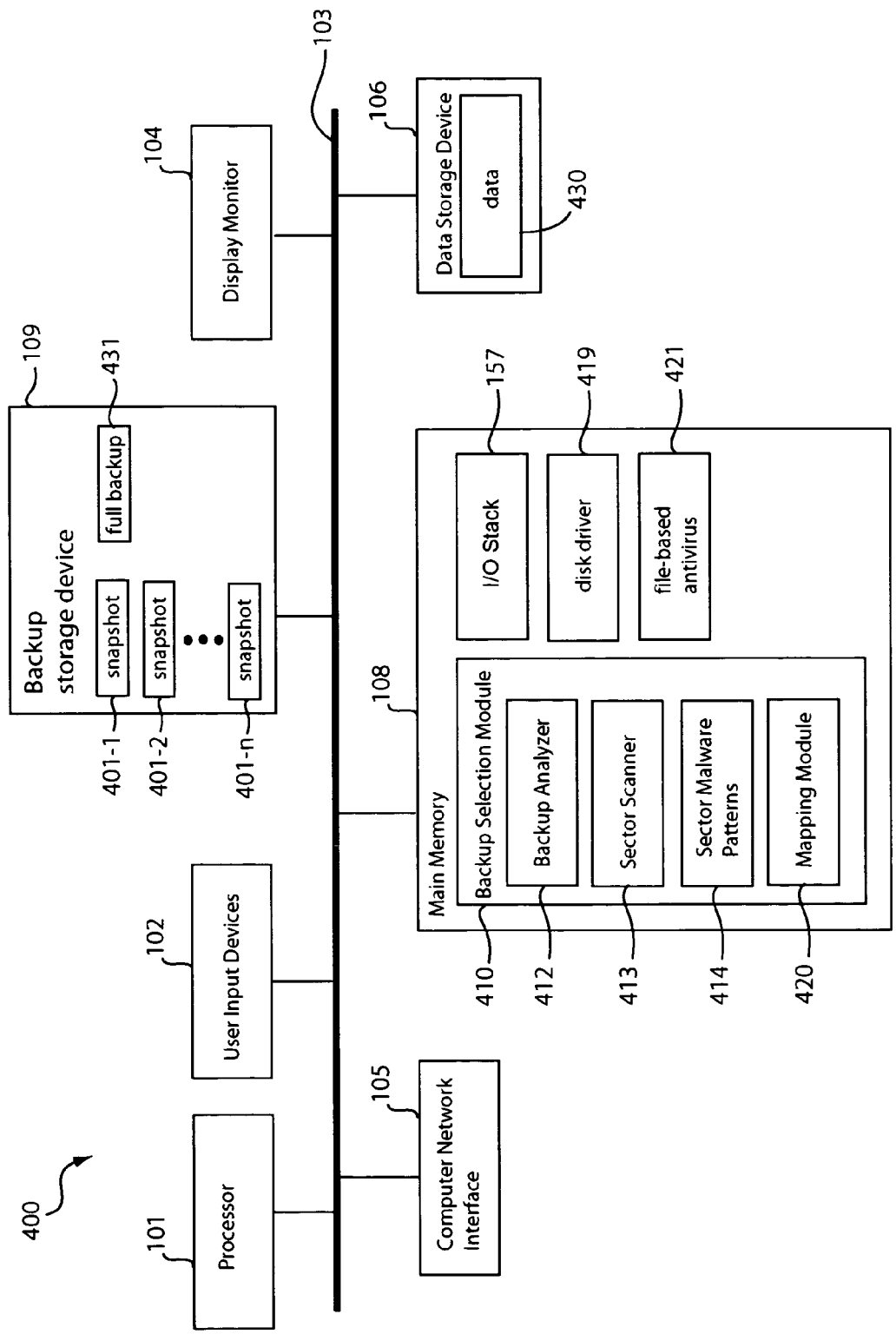
FIG. 4 shows a schematic diagram of a computer in accordance with an embodiment of the present invention.

Referring now to FIG. 4, there is shown a schematic diagram of a computer 400 in accordance with an embodiment of the present invention. The computer 400 may have less or more components to meet the needs of a particular application. As shown in FIG. 4, the computer 400 may include a processor 101, such as those from the Intel Corporation or Advanced Micro Devices, for example. The computer 400 may have one or more buses 103 coupling its various components. The computer 400 may include one or more user input devices 102 (e.g., keyboard, mouse), one or more data storage devices 106, a display monitor 104 (e.g., LCD, flat panel monitor, CRT), a computer network interface 105 (e.g., network adapter, modem), and a main memory 108 (e.g., RAM). In the example of FIG. 4, the main memory 108 includes software components of a backup selection module 410 as well as an I/O stack 157, a disk driver 419, and a file-based antivirus 421. The software modules in the main memory 108 may comprise computer-readable program code executable by the processor 101. As can be appreciated, one or more of these modules may also be implemented in hardware or combination of hardware and software without detracting from the merits of the present invention.

The computer 400 may further include a backup storage device 109 comprising backups of data 430 in a data storage device 106, which in this embodiment comprises a hard disk. The data 430 may be the entirety or a portion (e.g., one of several volumes) of the storage space of the data storage device 106. In conformance with common usage and for ease of illustration, the phrase "backup of a storage device" is interchangeably used herein with the phrase "backup of data stored in a storage device."

The backup storage device 109 may comprise any suitable backup storage device including another hard disk, writable optical disk, magnetic tape, and so on. In the example of FIG. 4, the backup storage device 109 includes one or more snapshots 401 (i.e., 401-1, 401-2, . . . , 401-n) and a full backup 431. The snapshots 401 and the full backup 431 may be stored in separate backup storage devices, but are shown as in a single backup storage device 109 for illustration purposes only. The snapshots 401 may also be stored in the data storage device 106.

The full backup 431 may be a complete copy (i.e., a clone) of the entirety of the data 430 in the data storage 106. The full backup 431 may be used by itself or together with one or more snapshots 401 to restore the data 430 in the event of an irrecoverable data storage device error, such as when the data storage device 106 crashes and cannot be accessed.

Figure 6:
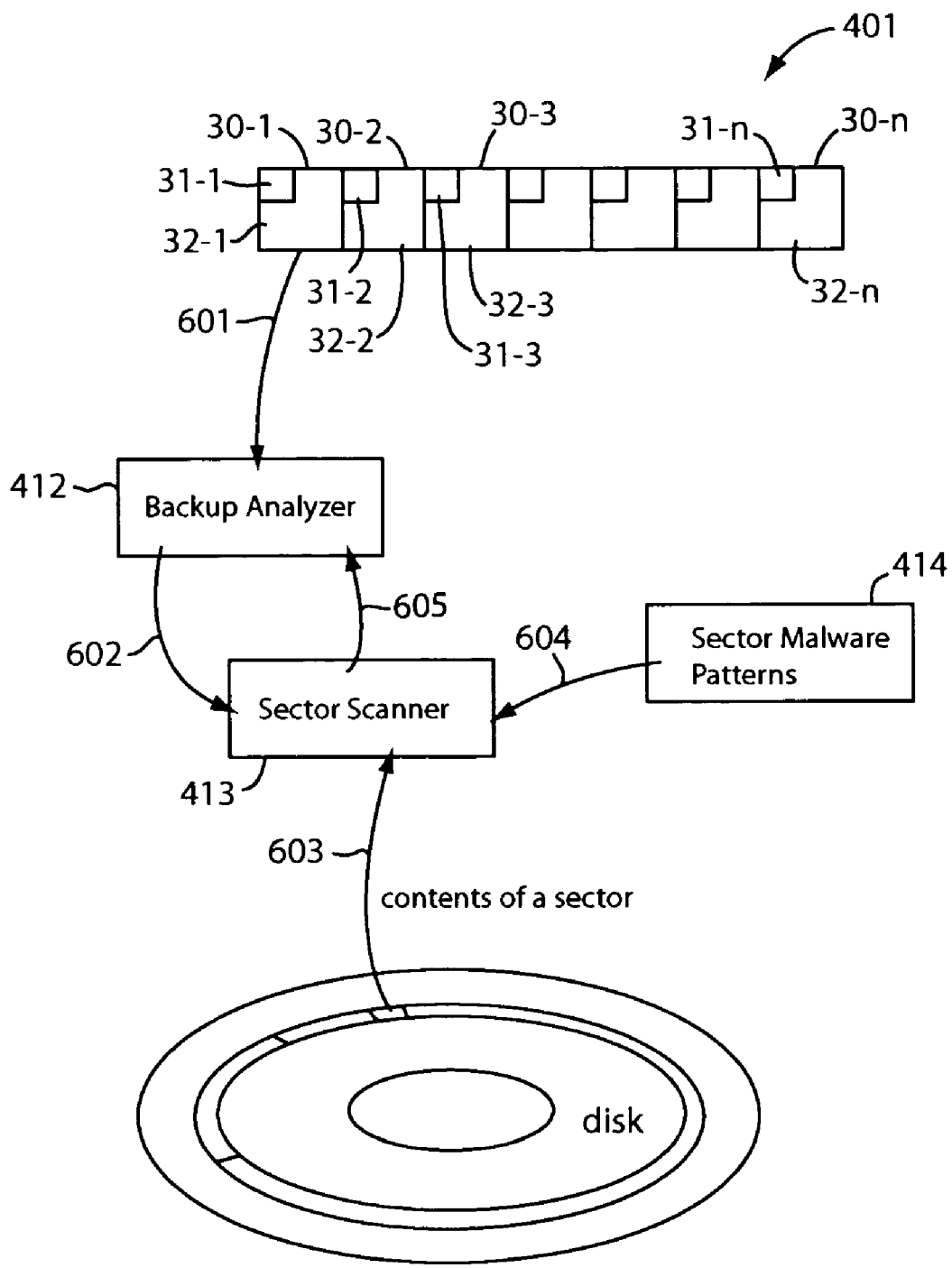
FIG. 6 shows a flow diagram schematically illustrating the operation of the components of a backup selection module in accordance with a first embodiment of the present invention.

A snapshot 401 may comprise an incremental backup of the data 430 at a particular point in time. For example, the full backup 431 may be created at time T0, the snapshot 401-1 may be taken at a time T1 (i.e., after time T0), the snapshot 401-2 may be taken at time T2 (i.e., after time T1), and so on. In one embodiment, a snapshot 401 comprises differential data created using a COW backup procedure. For example, a snapshot 401 may have differential data for sectors of the data storage device 106 that have been changed due to changes in the data 430. Each of the differential data may comprise original data stored in a sector prior to that sector being overwritten with new data. Referring to FIG. 6, a snapshot 401 may have several sections 30 (i.e., 30-1, 30-2, . . . , 30-n), with each section 30 including a sector address 31 (i.e., 31-1, 31-2, . . . , 31-n) and differential data 32 (i.e., 32-1, 32-2, . . . , 32-*n*). A sector address 31 identifies a physical storage location in the data storage device 106, and a differential data 32 is the original data in that physical storage location and which has been overwritten with new data. In one embodiment, a sector address 31 is the address of the smallest addressable physical storage location in the data storage device 106, which in this example is a hard disk sector. The modified sectors noted in a snapshot 401 may be occupied by different files. For example, the modified sector indicated by the section 30-1 may contain a portion of a first file, the modified sector indicated by the section 30-2 may contain a portion of a second file that is different from the first file, and so on. The snapshots 401 may be created using the Microsoft Volume Shadow Copy Service™ backup service, for example. The full backup 431 may be created using a backup tool of the operating system or a third-party full backup software.

The backup selection module 410 may comprise computer-readable program code configured to select a backup that is free of malwares among one or more backups. In one embodiment, the backup selection module 410 selects the most recent (i.e., one with most current data) malware-free snapshot 401 among several consecutively taken snapshots 401 created before an infection. The backup selection module 410 may scan all available snapshots 401 for viruses and recommend the most recent malware-free snapshot 401 that may be used to restore an infected computer. In the example of FIG. 4, the backup selection module 410 comprises a backup analyzer 412, a sector scanner 413, sector malware patterns 414, and a mapping module 420.

The backup analyzer 412 may comprise computer-readable program code configured to access the contents of a snapshot 401, to sequence through the sections 30 of a snapshot 401 for scanning by the sector scanner 413, and to manage the operations of the backup selection module 410. In some embodiments, the backup analyzer 412 may be configured to work with the mapping module 420 to identify a file associated with a section 30 of a snapshot 401 and to have that file scanned for malwares using a file-based antivirus 421.

The sector scanner 413 may comprise computer-readable program code for scanning a physical storage location in a data storage device, differential data in a snapshot, or both for presence of malwares. The sector scanner 413 may be configured to individually scan smallest addressable physical storage locations in the data storage device. The sector scanner 413 may also be configured to scan a differential data 32 in a snapshot 401. In one embodiment, the sector scanner 413 is configured to scan a sector of a storage device, such as the data storage device 106. This advantageously allows the sector scanner 413 to scan individual physical storage locations, such as those referenced by a snapshot 401. In marked contrast, conventional file-based antivirus only scans entire files, not small portions of a file. In one embodiment, the sector scanner 413 compares the contents of a sector to malware patterns included in the sector malware patterns 414. If the contents of the sector match a malware pattern in the sector malware patterns 414, the sector scanner 413 deems that sector to be infected.

In one embodiment, the sector scanner 413 accesses a sector of a storage device by way of a low-level hardware driver (e.g., low-level hardware driver 155 of FIG. 1) of the I/O stack 157 of the operating system. Alternatively or in addition, the sector scanner 413 may access a sector of a storage device using a separate low-level hardware disk driver 419 configured solely for use by components of the backup selection module 410. The disk driver 419 may be configured to directly access physical storage locations of the data storage device 106 by writing to or reading from registers of the data storage device 106, for example. Other ways of directly accessing addressable physical storage locations of a storage device may also be used without detracting from the merits of the present invention.

The sector malware patterns 414 may comprise patterns of known malwares. In one embodiment, each malware pattern in the sector malware patterns 414 fits in the smallest addressable physical storage location of a storage device, which in this example is a sector of a hard disk. For example, a malware pattern may be 512 bytes long if the storage device has 512-byte sectors. Each malware pattern may be created using techniques similar to those for file-based antivirus. For example, "honey pot" computer systems may be located all over the world to attract and collect information on malwares in the wild. Once a malware is detected in a honey pot computer, antivirus researchers (e.g., those with the TrendLabs™ antivirus research center of Trend Micro, Inc.) may examine the malware to determine the tell tale pattern it makes on a sector of an infected storage device. That pattern may be included in a pattern file for periodic distribution to subscribing computers 400 over the Internet for use as sector malware patterns 414, for example.

Figure 8:
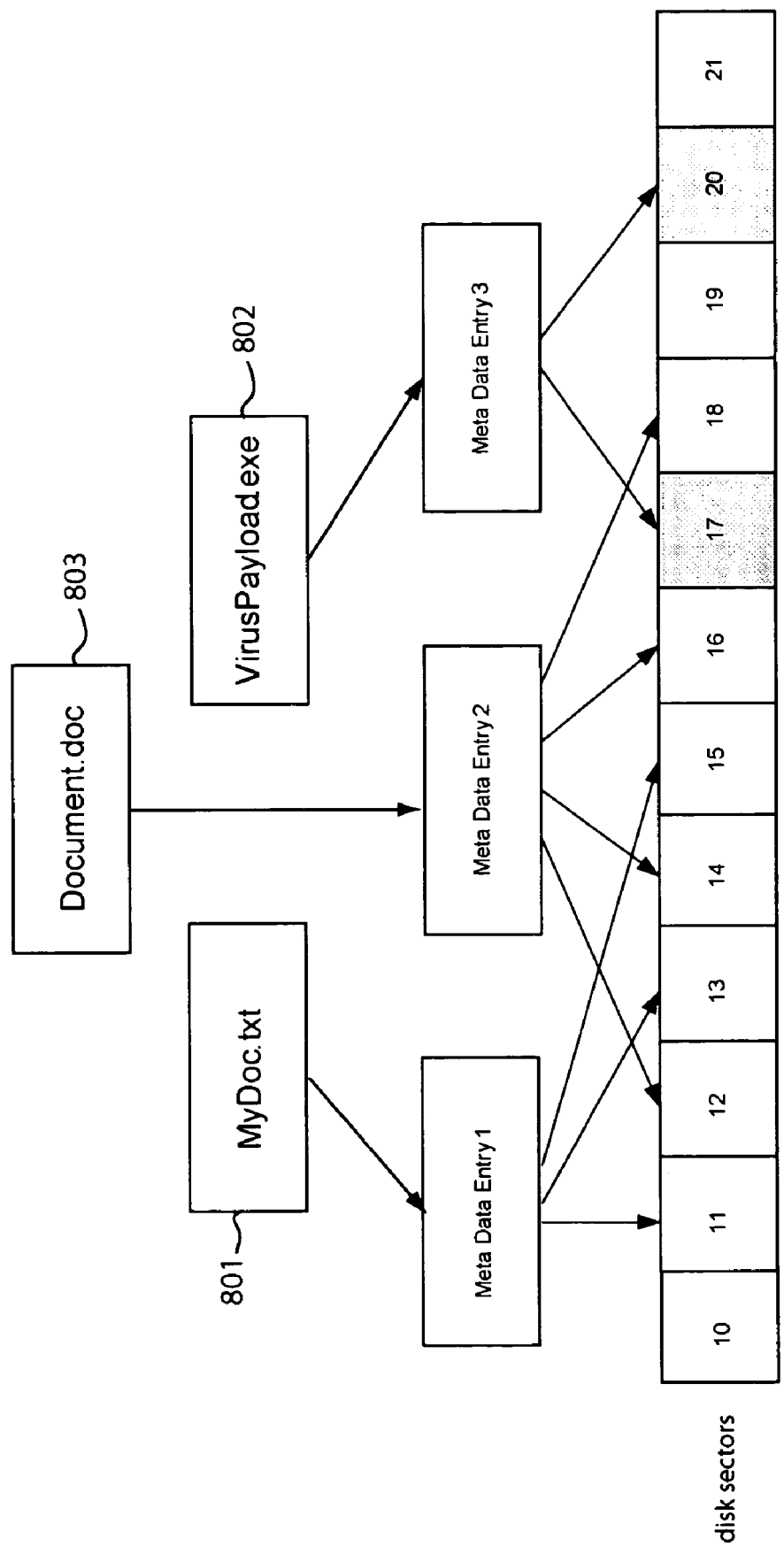
FIG. 8 schematically shows the mapping between files in a storage device and corresponding disk sectors containing data of the files.

The mapping module 420 may comprise computer-readable program code for identifying the file associated with data stored in an addressable physical storage location in a storage device. In one embodiment, the mapping module 420 is configured to determine which file a sector data belongs to. As can be appreciated, a file may be stored in several sectors of a data storage device. This is illustrated in FIG. 8 where a file 801 (named "MyDoc.txt" in the example) occupies sectors 11, 13, and 15 of a data storage device, which is a hard disk in the example. A meta data entry may be used to link together all sectors storing the contents of the file 801. The meta data entry, which may be part of or accessible to the file system, may comprise a bit map, for example. In one embodiment, the mapping module 420 receives a sector's address and identifies the file associated with that sector by consulting meta data entry in the file system or other module that has access to meta data entry for that sector. For example, the mapping module 420 may backtrack from a sector, the meta data entry for that sector, and then to the file associated with the meta data entry. As will be more apparent below, this allows the backup selection module 410 to read a snapshot 401 to find a sector that has been overwritten, identify the file whose data is in that sector, and scan that file for malwares using the file-based antivirus 421.

The file-based antivirus 421 may comprise computer-readable program code for scanning files for malwares. The file-based antivirus 421 may be a commercially available file-based antivirus, such as those available from Trend Micro, Inc., for example. Other ways of scanning files for malwares may also be used without detracting from the merits of the present invention. In one embodiment, the file-based antivirus 421 is employed to scan the full backup 431 and files associated with modified sectors for malwares. The full backup 431 may be scanned using the file-based antivirus 421 because, unlike a snapshot 401, the full backup 431 typically includes entire files.

Figure 5:
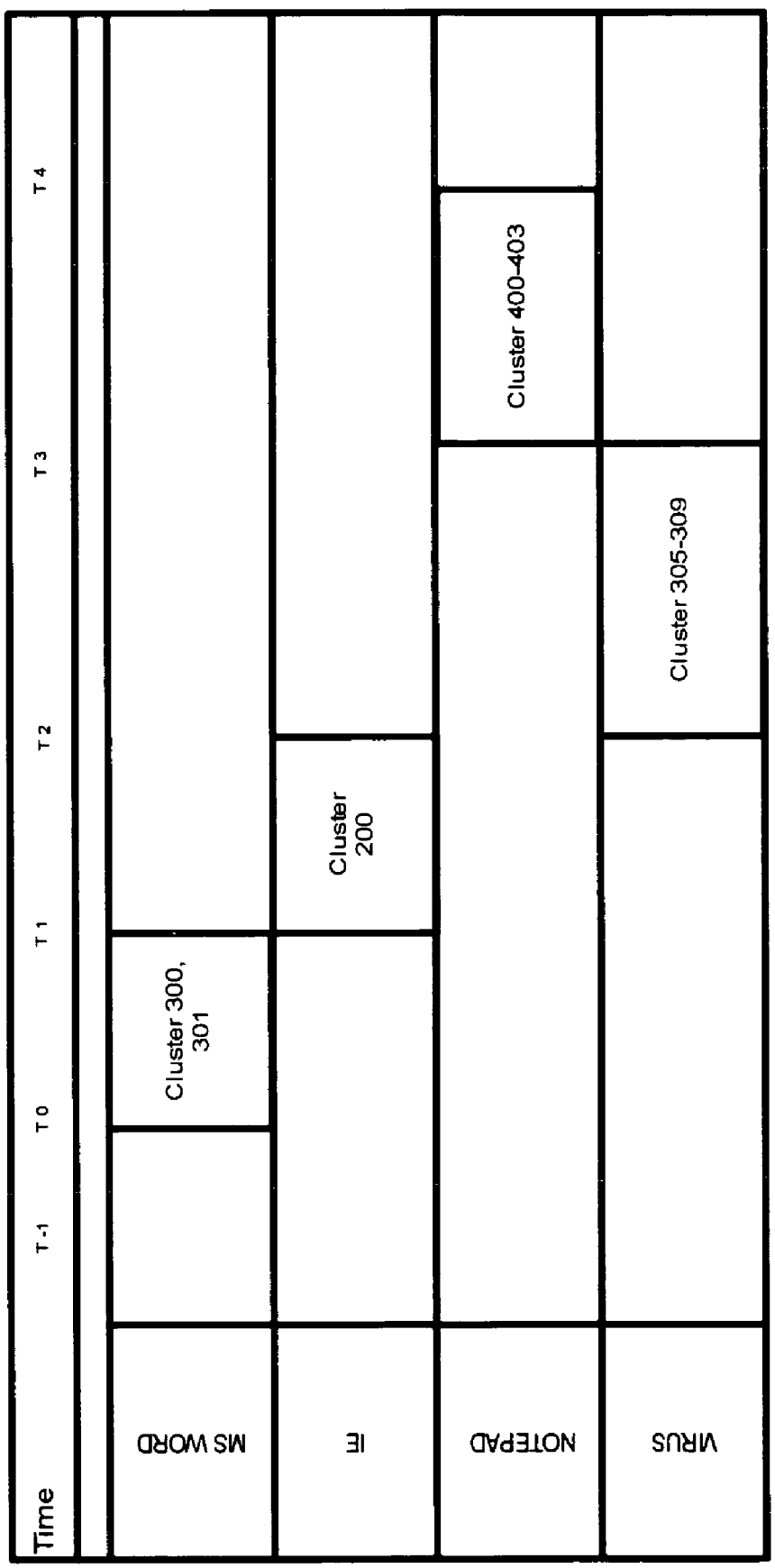
FIG. 5 shows clusters of a data storage device modified by various programs at different points in time.

An example operation of the backup selection module 410 is now described with reference to FIG. 5. FIG. 5 shows the clusters of a data storage device modified by various programs at different points in time. In the example of FIG. 5, the Microsoft Word™ word processing program modified clusters 300 and 301 of the data storage device between times T0 and T1; the Microsoft Internet Explorer™ web browser modified cluster 200 between times T1 and T2; the Microsoft Notepad™ application modified clusters 400-403 between times T3 and T4; and a virus modified clusters 305-309 between times T2 and T3. A COW snapshot 401 is taken at each of times T1, T2, T3, and T4. The snapshot 401 taken at time T4 includes the differential data for the sectors of clusters 400-403; the snapshot taken at time T3 includes the differential data for the sectors of clusters 305-309; the snapshot taken at time T2 includes the differential data for the sectors of cluster 200; the snapshot taken at time T1 includes the differential data for the sectors of clusters 300 and 301. In one embodiment, the backup selection module 410 scans for malwares individual sectors in the data storage device that are indicated in the snapshots 401 as having been modified. In the example of FIG. 5, the backup selection module would thus scan for malwares each sector of clusters 400-403, clusters 305-309, cluster 200, and clusters 300 and 301 in the data storage device itself. Doing so would reveal that sectors of clusters 305-309 (which are noted in the snapshot 401 taken at time T3) are infected by a virus, and that other sectors indicated in the other snapshots 401 are virus-free. Accordingly, the backup selection module 410 would recommend to the user to restore his or her file system using the snapshot 401 taken at time T2 as that is the latest snapshot 401 taken before the system got infected by the virus between times T2 and T3.

FIG. 6 shows a flow diagram schematically illustrating the operation of the components of the backup selection module 410 in accordance with a first embodiment of the present invention. The mapping module 420 is not employed in this first embodiment. In the example of FIG. 6, the backup analyzer 412 retrieves a snapshot 401 and goes through each of its sections 30. The backup analyzer 412 retrieves a sector address 31 of a section 30 (arrow 601). As can be appreciated, the sector address 31 is the address of a modified sector in the storage device. The backup analyzer 412 provides the sector address 31 and the corresponding differential data 32 to the sector scanner 413 (arrow 602), which retrieves the current contents of the sector having that sector address (arrow 603). The sector scanner 413 compares the contents of the sector and the differential data to malware patterns in the sector malware patterns 414 (arrow 604) to determine if the sector or differential data contains a malware or one or more portions of a malware. This allows the sector scanner 413 to determine if the sector in the storage device has been modified by a malware. The sector scanner 413 deems the sector infected if the contents of the sector in the storage device, corresponding differential data in the snapshot, or both match a malware pattern in the sector malware patterns 414. Otherwise, the sector scanner 413 deems the sector to be free of malwares. The sector scanner 413 reports the result of the scanning to the backup analyzer 412 (arrow 605), which keeps track of the scanning results. The backup analyzer 412 repeats the process for the next section 30 of the snapshot 401 and then to the next snapshot 401, if any. Preferably, this sector scanning process is performed for all available snapshots 401 because a malware may be in any of the snapshots 401 due to the nature of copy-on-write, which only backs up differential data. After evaluating all available snapshots 401, the backup analyzer 412 may examine the scanning results to find the latest (e.g., by date) snapshot 401 with no infected modified sector and has been taken before any snapshot 401 that includes one or more infected modified sectors. That is, the backup analyzer 412 preferably selects the latest snapshot 401 taken before the data storage device got infected. The selected snapshot 401 may be used to restore the data storage device to a clean state.

Figure 7:
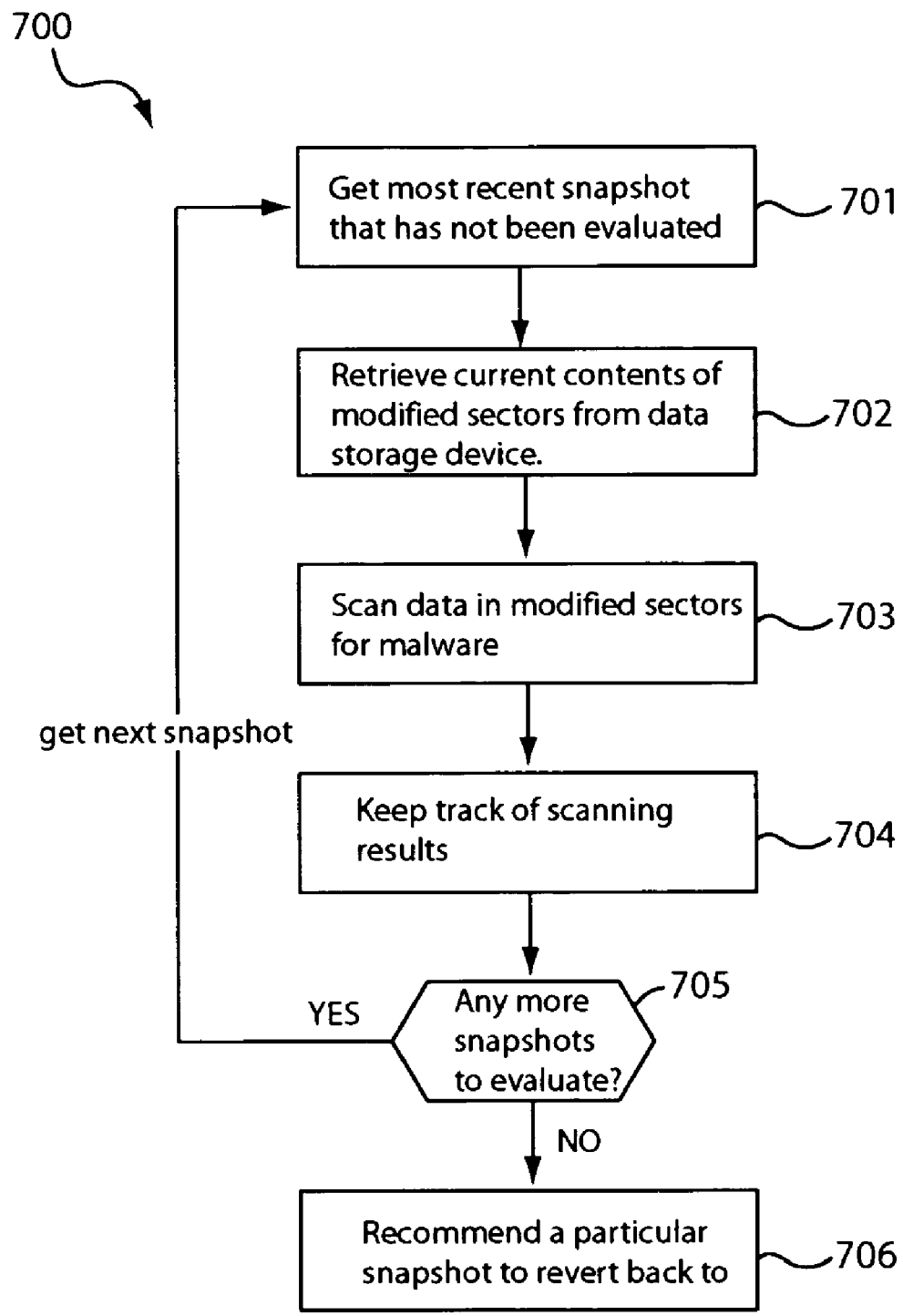
FIG. 7 shows a flow diagram of a method of selecting an incremental backup copy among a plurality of incremental backup copies in accordance with the first embodiment of the present invention.

FIG. 7 shows a flow diagram of a method 700 of selecting an incremental backup copy among a plurality of incremental backup copies in accordance with the first embodiment of the present invention. The method 700 may be employed to select an incremental backup that may be used to restore data on a storage device. In one embodiment, the method 700 is employed to select a copy-on-write snapshot (e.g., a snapshot 401) among a plurality of copy-on-write snapshots. The method 700 will be explained using the components shown in FIG. 4 for illustration purposes only. Other components may also be used without detracting from the merits of the present invention.

In the method 700, the backup analyzer 412 retrieves the most recent snapshot 401 that has not been evaluated for malware detection purposes (step 701). The backup analyzer 412 reads all sector information from the snapshot 401, including the addresses of modified sectors. This may be performed by reading the sector addresses 31 of the snapshot 401. The backup analyzer 412 provides the sector addresses 31 to the sector scanner 413, which uses the sector addresses 31 to retrieve the contents of the modified sectors from the data storage device (step 702). The sector scanner 413 individually scans the current contents of the modified sectors for presence of malwares (step 703). Optionally or in addition, the sector scanner 413 also scans corresponding differential data 32 for malwares. The sector scanner 413 informs the backup analyzer 412 of the results of the scanning. The backup analyzer 412 keeps track of the results of the scanning (step 704). The backup analyzer 412 checks to see if there is snapshot 401 that has not been evaluated for malware detection (step 705). If so, the backup analyzer 412 retrieves that snapshot 401 for scanning as previously described. Otherwise, the backup analyzer 412 reviews the scanning results to recommend a malware-free snapshot 401 that may be used to restore the backed up data (step 706). The recommended snapshot 401 may be the latest one taken before any snapshot 401 that notes an infected modified sector.

As can be appreciated, the just described embodiments for evaluating backups not only allow for scanning of individual modified sectors noted in a snapshot but are also relatively fast compared to traditional file-based scanning. This is because unlike file-based scanning, scanning individual modified sectors noted in a snapshot only requires scanning of small portions of the data storage device rather than entire files.

FIG. 8 schematically shows the mapping between files in a storage device and corresponding disk sectors containing data of the files. In the example of FIG. 8, the file 801 is a virus-free file and occupies disk sectors 11, 13, and 15. A meta data entry 1 allows the sectors 11, 13, and 15 to be associated with the file 801. Also in the example of FIG. 8, a file 802 comprising a virus occupies sectors 17 and 20. A meta data entry 3 allows the sectors 17 and 20 to be associated with the file 802. A meta data entry 2 allows the sectors 12, 14, 16, and 18 to be associated with another file 803. Because the virus had to modify the disk sectors 17 and 20 to be written there, a snapshot 401 would include information about the original contents of disk sectors 17 and 20. One way of detecting the virus is to scan the current contents of disk sectors 17 and 20 on the disk using the sector scanner 413, as previously described. Another way is to detect the modification to disk sectors 17 and 20 from information included in a snapshot 401, use the meta data entry 3 to trace back to the file 802 whose contents are in the disk sectors 17 and 20, and then scan the file 802 for malwares using a conventional file-based virus scanner, such as the file-based antivirus 421. This embodiment is further explained beginning with FIG. 9.

Figure 9:
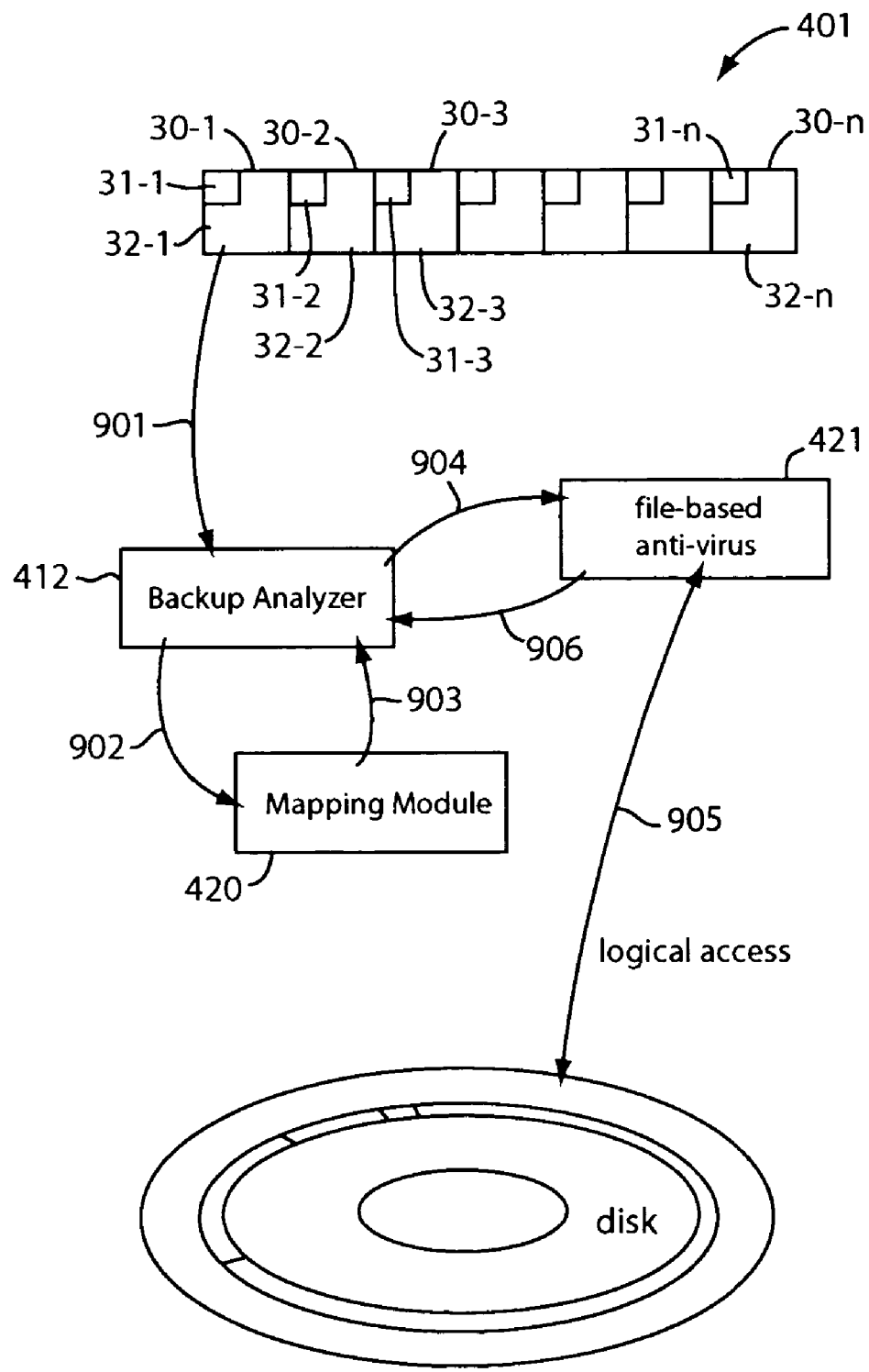
FIG. 9 shows a flow diagram schematically illustrating the operation of the components of a backup selection module in accordance with a second embodiment of the present invention.

FIG. 9 shows a flow diagram schematically illustrating the operation of the components of the backup selection module 410 in accordance with a second embodiment of the present invention. As will be more apparent below, the sector scanner 413 and the sector malware patterns 414 are not employed in this second embodiment. Instead, the mapping module 420 together with the file-based antivirus 421 is used to scan files occupying modified sectors.

In the example of FIG. 9, the backup analyzer 412 retrieves a snapshot 401 and goes through each of its sections 30. The backup analyzer 412 retrieves a sector address 31 of a section 30 (arrow 901). The sector address 31 is the address of a modified sector in the storage device. The backup analyzer 412 provides the sector address 31 to the mapping module 420 (arrow 902), which identifies the file occupying the sector having that sector address. The mapping module 420 reports the file to the backup analyzer 412 (arrow 903), which then requests the file-based antivirus 421 to scan the file (arrow 904). The mapping module 420 may forward to the backup analyzer 412 the name of the file and its logical (e.g., directory) location in the storage device. The backup analyzer 412 may forward the same information to the file-based antivirus 421 to allow it to logically (as opposed to physically) locate, access, and scan the file for malwares (arrow 905). The file-based antivirus 421 informs the backup analyzer 412 of the result of the scanning (arrow 906), such as whether or not the file contains a malware or a portion of a malware. If the file contains a malware or a portion of a malware, the modified sector indicated in the snapshot 401 may have been modified by a malware. The backup analyzer 412 keeps track of the scanning results, and repeats the process for the next section 30 of the snapshot 401 and then for the next snapshot 401 yet to be evaluated. After evaluating all available snapshots 401, the backup analyzer 412 may examine the scanning results to find the latest snapshot 401 with no infected modified sector and has been taken before any snapshot 401 that includes one or more infected modified sectors. That snapshot 401 may be used to restore the data storage device to a clean state.

Figure 10:
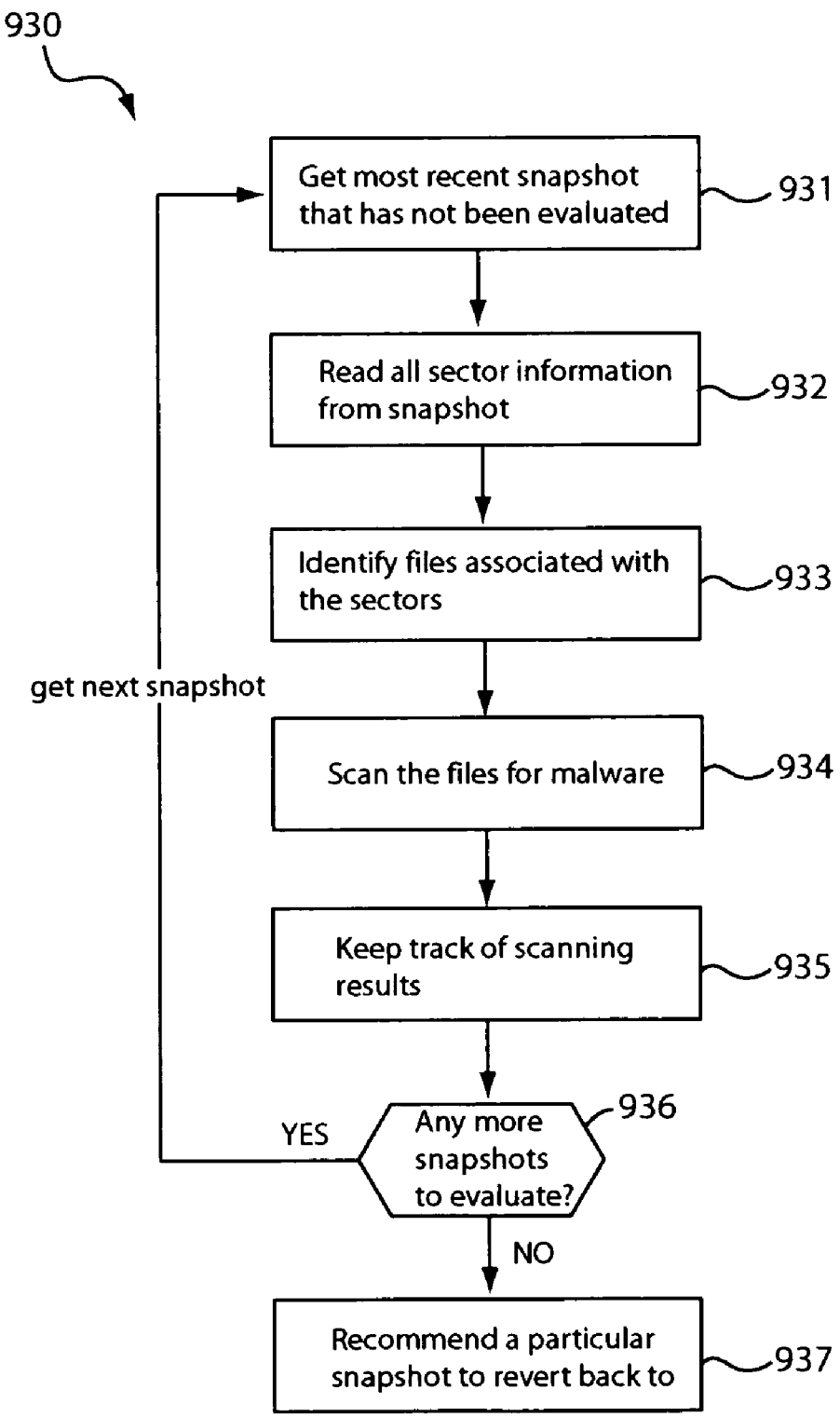
FIG. 10 shows a flow diagram of a method of selecting an incremental backup copy among a plurality of incremental backup copies in accordance with the second embodiment of the present invention.

Referring now to FIG. 10, there is shown a flow diagram of a method 930 of selecting an incremental backup copy among a plurality of incremental backup copies in accordance with the second embodiment of the present invention. The method 930 may be employed to select an incremental backup that may be used to restore data on a storage device. In one embodiment, the method 930 is employed to select a copy-on-write snapshot (e.g., a snapshot 401) among a plurality of copy-on-write snapshots. The method 700 will be explained using the components shown in FIG. 4 for illustration purposes only. Other components may also be used without detracting from the merits of the present invention.

In the method 930, the backup analyzer 412 retrieves the most recent snapshot 401 that has not been evaluated for malware detection purposes (step 931). The backup analyzer 412 reads all sector information from the snapshot 401, including the addresses of modified sectors (step 932). The backup analyzer 412 provides the address of the modified sectors to the mapping module 420, which then identifies the files associated with the modified sectors (i.e., the files having portions in the modified sectors) (step 933). The mapping module 420 informs the backup analyzer 412 of the identified files. The backup analyzer 412 requests the file-based antivirus 421 to scan each of the identified files for malwares. The file-based antivirus 421 scans the files for malwares (step 934) and reports the results of the scanning to the backup analyzer 412. The backup analyzer 412 keeps track of the scanning results (step 935). The backup analyzer 412 checks to see if there is a snapshot 401 that has not been evaluated for malware detection (step 936). If so, the backup analyzer 412 retrieves that snapshot 401 for scanning as previously described. Otherwise, the backup analyzer 412 reviews the scanning results to recommend a malware-free snapshot 401 that may be used to restore the backed up data (step 937). The recommended snapshot 401 may be the latest one taken before any snapshot 401 that notes an infected modified sector.

While specific embodiments of the present invention have been provided, it is to be understood that these embodiments are for illustration purposes and not limiting. Many additional embodiments will be apparent to persons of ordinary skill in the art reading this disclosure.

What is claimed is:

1. A method of evaluating incremental backup copies of data stored in a data storage device of a computer, the method comprising: accessing a first snapshot of a data storage device, the first snapshot comprising an incremental backup of the data of the data storage device and including information indicative of sectors of the data storage device that have been modified, the first snapshot being taken at a first point in time; reading from the data storage device current contents of a first modified sector of the data storage device noted in the first snapshot, the first modified sector containing data of a first file; scanning the current contents of the first modified sector in the data storage device and corresponding data in the incremental backup for malicious codes, the first modified sector being selected for scanning for malicious codes based on information from the incremental backup; reading from the data storage device current contents of a second modified sector of the data storage device noted in the first snapshot, the second modified sector containing data of a second file that is different from the first file; scanning the current contents of the second modified sector in the data storage device and corresponding data in the incremental backup for malicious codes, the second modified sector being selected for scanning for malicious code based on information from the incremental backup; and determining if the first snapshot together with a full backup of the data storage device can be used for restoring the data storage device based at least on scanning for malicious codes of current contents of individual modified sectors of the data storage device noted in the first snapshot.

2. The method of claim 1 further comprising: accessing a second snapshot of the data storage device, the second snapshot comprising an incremental backup of data of the data storage device and including information indicative of sectors of the data storage device that have been modified; reading from the data storage device current contents of a third modified sector of the data storage device noted in the second snapshot, the third modified sector containing data of a third file; scanning the current contents of the third modified sector for malicious codes, the third modified sector being selected for scanning for malicious codes based on information from the second snapshot; reading from the data storage device current contents of a fourth modified sector of the data storage device noted in the second snapshot, the fourth modified sector containing data of a fourth file that is different from the third file; scanning the current contents of the fourth modified sector for malicious codes, the fourth modified sector being selected for scanning for malicious codes based on information from the second snapshot; and determining which of the first snapshot or the second snapshot can be used to restore the data storage device based at least on scanning for malicious codes of current contents of individual modified sectors of the data storage device noted in the first snapshot and individual modified sectors noted in the second snapshot.

3. The method of claim 1 wherein the first snapshot is created using a copy-on-write backup procedure.

4. The method of claim 1 wherein the data storage device comprises a hard disk.

5. The method of claim 1 wherein scanning the current contents of the first modified sector for malicious codes comprises: comparing the current contents of the first modified sector to a plurality of sector patterns of known malicious codes.

6. The method of claim 1 further comprising: restoring the data storage device to a clean state using the first snapshot when the first snapshot is deemed suitable for restoring the data storage device.

7. The method of claim 1 wherein the first snapshot includes a sector address and differential data for each modified sector, and further comprising: scanning differential data in the first snapshot for malicious codes.

8. A method of evaluating incremental backup copies of data stored in a data storage device of a computer, the method comprising: accessing a snapshot of a data storage device, the snapshot comprising an incremental backup of the data storage device and including information indicative of modified addressable storage units of the data storage device, the modified addressable storage units noted in the snapshot containing portions of several different files; and determining if the modified addressable storage units of the data storage device noted in the snapshot have been modified by malicious code, the modified addressable storage units of the data storage device being selected for determination of modification by malicious code based on information from the incremental backup; and selecting the snapshot together with a full backup of the data storage device to restore the data storage device based on scanning of the modified addressable storage units of the data storage device and corresponding data in the snapshot for malicious codes.

9. The method of claim 8 wherein determining if the modified addressable storage units of the data storage device noted in the snapshot have been modified by malicious code comprises: reading from the data storage device current contents of the modified addressable storage units; and scanning each individual modified addressable storage unit for malicious codes.

10. The method of claim 9 wherein the data storage device comprises a hard disk and each of the modified addressable storage units comprises a hard disk sector of the data storage device.

11. The method of claim 8 wherein determining if the modified addressable storage units of the data storage device noted in the snapshot have been modified by malicious code comprises: reading current contents of a plurality of sectors of the data storage device noted in the snapshot as having been modified; and scanning the current contents of each sector in the plurality of sectors for malicious codes.

12. The method of claim 11 wherein scanning the current contents of each sector in the plurality of sectors for malicious codes comprises: comparing the current contents of each sector in the plurality of sectors to sector patterns of known malicious codes.

13. The method of claim 8 wherein determining if the modified addressable storage units of the data storage device noted in the snapshot have been modified by malicious code comprises: determining from the snapshot sectors of the data storage device that have been modified; identifying files associated with sectors of the data storage device noted in the snapshot as having been modified; and scanning an entirety of each of the identified files for malicious codes.

14. The method of claim 13 wherein the data storage device comprises a hard disk.

* * * * *